United States Patent [19]
Nedderman, Jr.

[11] Patent Number: 5,898,109
[45] Date of Patent: Apr. 27, 1999

[54] STRUT-MOUNTED DRAG BALANCE

[75] Inventor: William H. Nedderman, Jr., Middletown, R.I.

[73] Assignee: The United States of America as represented by the Secretary of the Navy, Washington, D.C.

[21] Appl. No.: 08/828,233

[22] Filed: Mar. 25, 1997

[51] Int. Cl.$^6$ ........................................................ B63B 9/08
[52] U.S. Cl. ..................... 73/147; 73/862.627; 73/170.15
[58] Field of Search ............................ 73/170.15, 170.01, 73/170.02, 170.03, 861.71, 861.72, 861.74, 861.75, 861.76, 147

[56] References Cited

U.S. PATENT DOCUMENTS

| | | | |
|---|---|---|---|
| 2,826,914 | 3/1958 | Reiley | 73/861.74 |
| 3,380,299 | 4/1968 | Seymour | 73/861.74 |
| 3,878,714 | 4/1975 | Protta et al. | 73/170.02 |
| 4,604,906 | 8/1986 | Scarpa | 73/861.74 |

*Primary Examiner*—Ronald Biegel
*Attorney, Agent, or Firm*—Michael J. McGowan; Prithvi C. Lall; Robert W. Gauthier

[57] ABSTRACT

A drag balance for measuring drag forces on a model is described which mounts within a hollow region of a streamlined strut. The strut is attached to a carriage for towing the model through a medium. The drag balance has a ground frame attached inside the strut and a balance frame attached to the flat plate at the base of the strut. The ground frame and balance frame are connected by flexures which allow only a small amount of movement of the balance frame and model relative to the ground frame and strut in the towing direction. Strain gages are attached to one or more of the flexures to determine the amount of bending in the flexures and thus obtain a measure of the drag forces exerted on the model. Mounting the drag balance within the streamlined strut minimizes turbulence and allows the drag balance to be connected directly to the model at the base of the strut such that drag forces on the model are accurately determined.

10 Claims, 2 Drawing Sheets

STRUT-MOUNTED DRAG BALANCE

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

(1) Field of the Invention

The present invention relates generally to the measurement of drag forces on a surface, and more particularly to a strut-mounted drag balance for measuring drag force on a flat plate moving through a medium.

(2) Description of the Prior Art

The performance of a vehicle moving through a medium is limited by the drag force of the medium on the vehicle. To improve efficiency and reduce the power required to move the vehicle through the medium, numerous drag reduction methods have been tried. It is customary to test drag reduction methods by model testing in towing basins or wind and water tunnels where a scaled model of the vehicle is towed through the medium or the medium is flowed past the model. To measure drag forces on the model, a towing post, or strut is attached to the model through a load cell, or drag balance. Typical prior art drag balances, as exemplified by U.S. Pat. No. 5,343,742 to Cusanelli et al., consist essentially of a hollow metal cube, generally four inches on a side, with portions of the sides removed, leaving planar top and bottom surfaces connected by four legs. The strut is attached to the top surface and the model is attached to the lower surface. Forces exerted on the model cause bending in the legs which is measured using strain gages attached to the legs. When the model is submerged in the medium such that the towing post extends into the medium, the strut is streamlined to minimize extraneous drag forces exerted on the strut, and the drag balance is placed within the scaled model. Testing of drag reduction methods which do not rely on vehicle shape to reduce drag, e.g., polymer injection and magneto hydrodynamic turbulence control devices, is complicated by the difficulty of predicting drag on a model shaped as a scaled vehicle. It is preferable to test such drag reduction methods using a flat plate model since drag calculations are much simpler for a flat plate model than for a hydrodynamically shaped model, thus actual test results can be easily compared to theoretical predictions. Since the flat plate has no interior volume, the drag balance cannot be placed within the plate. The cubic configuration of current drag balances would cause considerable turbulence if placed between the strut and the flat plate. If the drag balance were placed above the strut, the drag forces exerted on the strut itself would corrupt the drag reduction measurements. Additionally, The size of current drag balances also prevents their placement within an efficiently streamlined strut.

SUMMARY OF THE INVENTION

Accordingly, it is an object of the present invention to provide a drag balance which does not create additional turbulence when towed through a medium.

Another object of the present invention is to provide a drag balance which can be mounted in close proximity to a flat plate model.

Still another object of the present invention is to provide a drag balance which can be incorporated into a streamlined strut or towing post.

Other objects and advantages of the present invention will become more obvious hereinafter in the specification and drawings.

In accordance with the present invention, a drag balance is provided within a hollow region of a streamlined strut. The drag balance has a ground frame attached inside the strut and a balance frame attached to the flat plate at the base of the strut. The ground frame and balance frame are connected by flexures which allow only a small amount of lateral movement of the balance frame and model relative to the ground frame and strut. Strain gages are attached to one or more of the flexures to determine the amount of bending in the flexures and thus obtain a measure of the drag forces exerted on the model. Since the drag balance is mounted within the streamlined strut, turbulence is minimized. The drag balance is also connected directly to the model at the base of the strut such that drag forces on the model can be accurately determined. Further, the ground frame and balance frame can be easily shaped to conform within an efficiently streamlined strut.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 1:
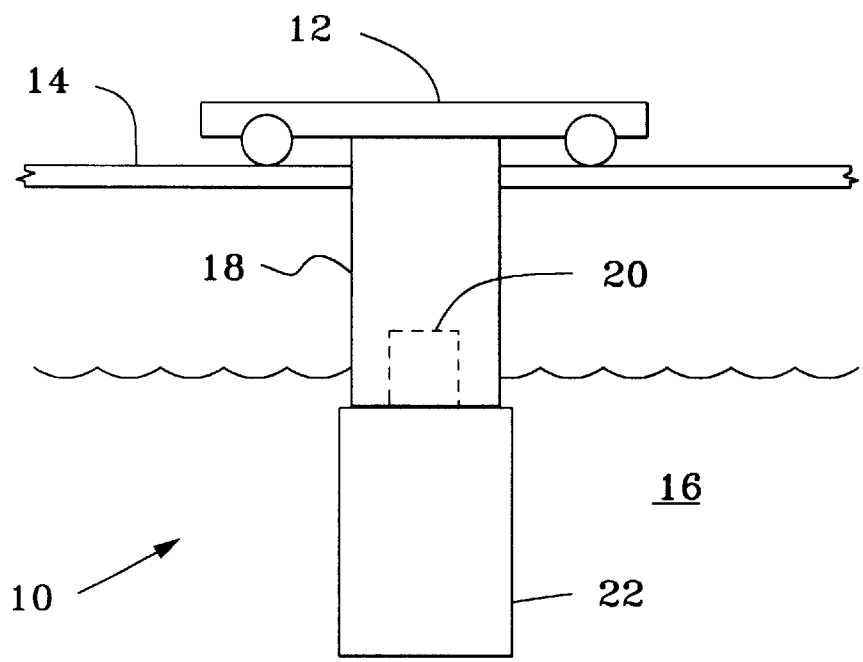
FIG. 1 is a schematic representation of a drag reduction measurement test system using the drag balance of the present invention.

Referring now to FIG. 1, there is shown a schematic representation of a drag reduction measurement system 10. A tow carriage 12 rides on rails 14 above the surface of medium 16. A streamlined strut 18 is suspended from carriage 12 and extends into medium 16. Strut 18 is hollow and has a drag balance, shown by dashed outline 20, mounted within its lower portion. A flat plate 22 is attached to the lower end of drag balance 20. As carriage 12 moves along rails 14, strut 18 and plate 22 are moved through medium 16. Drag forces exerted by medium 16 on plate 22 are transferred to and measured by drag balance 20.

Figure 2:
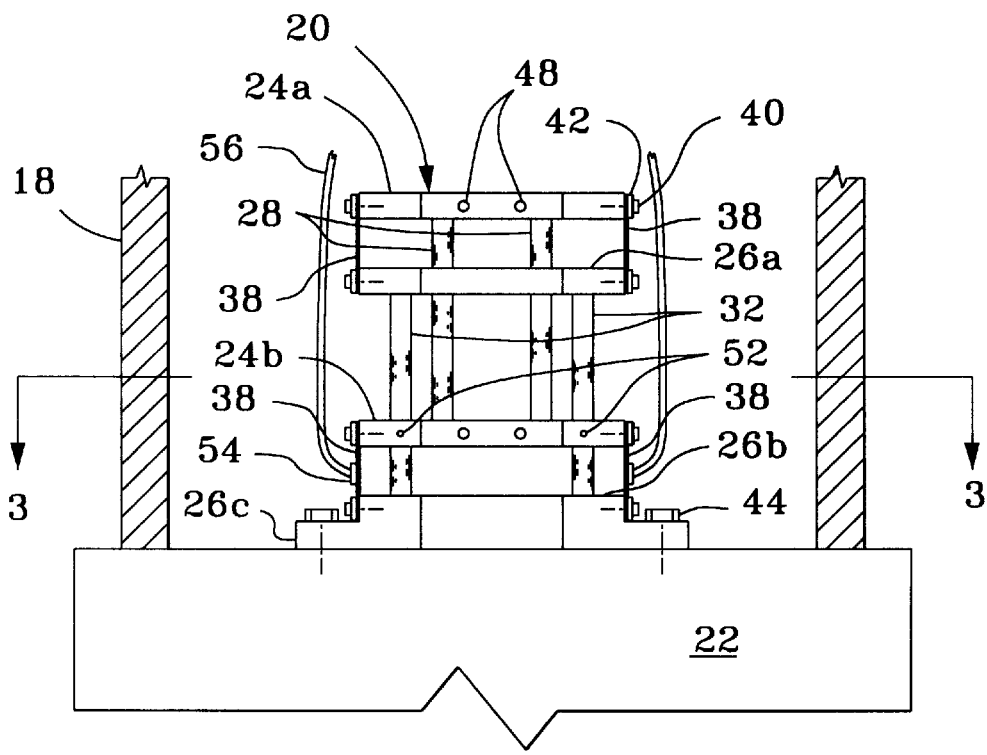
FIG. 2 is a side view of the drag balance of the present invention shown mounted within a cross section of a strut.
Figure 3:
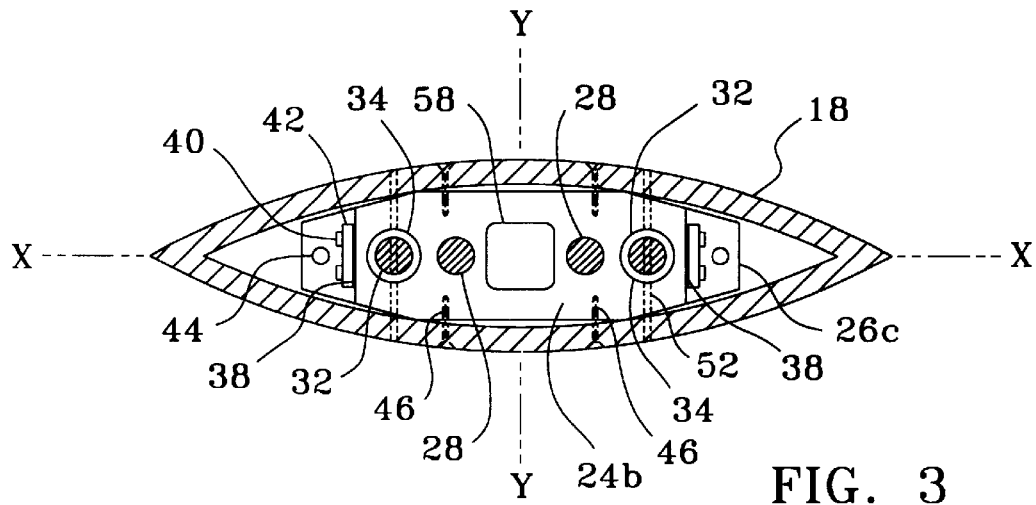
FIG. 3 is a cross sectional view taken along the line 3—3 of FIG. 2 showing a top view of the drag balance of the present invention mounted within a streamlined strut.
Figure 4:
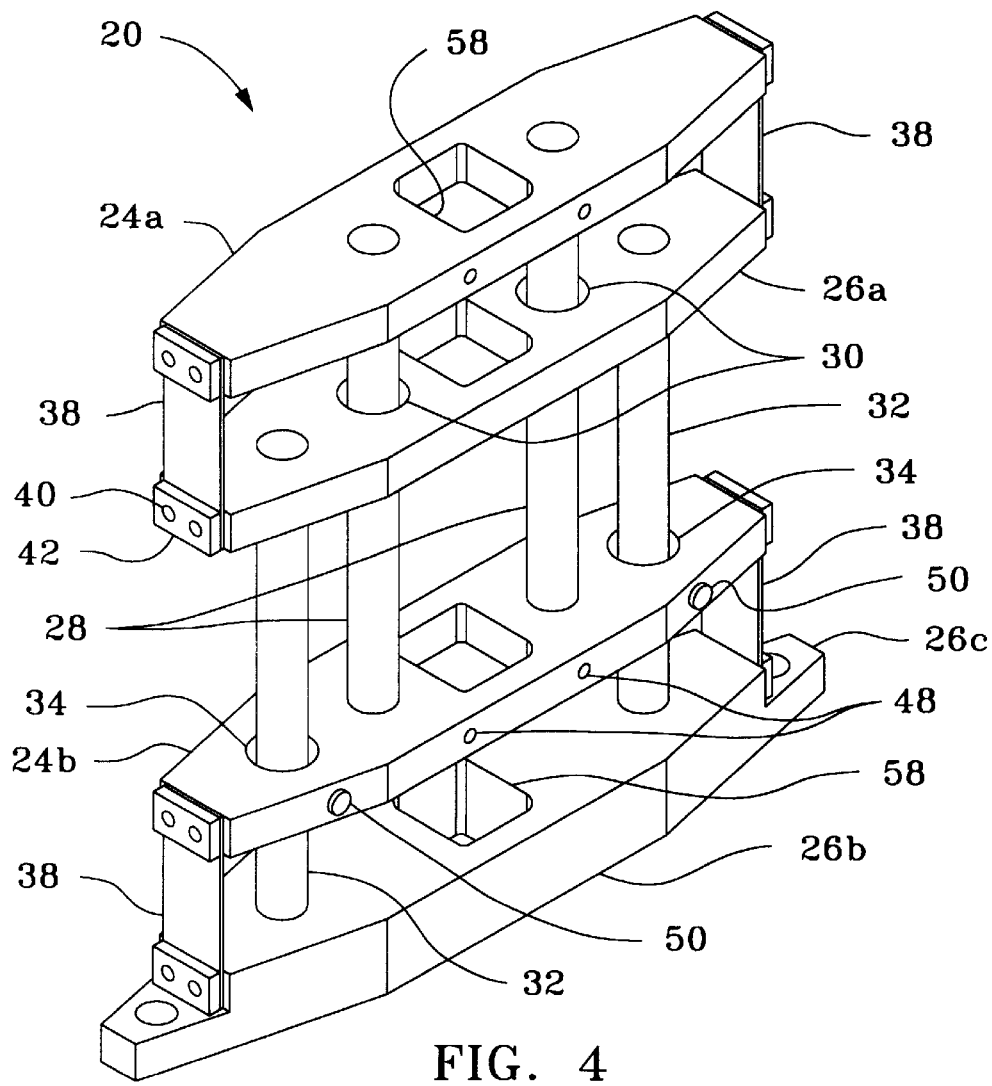
FIG. 4 is an isometric view of the drag balance of the present invention.

Referring now to FIGS. 2 through 4, FIG. 2 shows a side cross sectional view of the lower end of strut 18 with drag balance 20 mounted therein FIG. 3 shows a cross section taken along line 3—3 of FIG. 2 and FIG. 4 shows an isometric view of drag balance 20. Drag balance 20 consists of upper and lower ground frames, 24a and 24b, and upper and lower balance frames, 26a and 26b. The ground frames 24a and 24b are so denominated as to indicate that they serve as the reference, or ground, state of the drag balance 20, i.e., they are affixed to strut 18. The balance frames 26a and 26b are so denominated as to indicate that the drag on flat plate 22 is reflected, or balanced, by the movement of balance frames 26a and 26b relative to strut, i.e., they are affixed to flat plate 22. It can be seen that frames 24a, 24b, 26a and 26b are shaped to generally conform to the streamline shape of strut 18. Two ground columns 28 are spaced along the longitudinal axis X—X of drag balance 20 and are attached between upper and lower ground frames, 24a and 24b, passing through balance bores 30 in upper balance frame 26a. Similarly, two balance columns 32 are attached between upper and lower balance frames, 26a and 26b, along axis X—X and passing through ground bores 34 in lower ground frame 24b. In the preferred embodiment shown, columns 28 and 32 are shown as round rods press fit into corresponding press fit bores 36 in the frames. It will be readily understood that the columns can be of generally any shape and can be affixed to the frames in any suitable manner. The round shape of columns 28 and 32 shown allows for easy machining of bores 30 and 34. Press fitting allows for easy assembly and disassembly of drag balance 20. A flexure plate 38 is attached at each end of the frames between upper ground frame 24a and upper balance frame 26a and between lower ground frame 24b and lower balance frame 26b. In the preferred embodiment shown, flexure plates 38 are fabricated of stainless steel feeler gage stock such that movement parallel to axis X—X is accommodated by bending of flexure plates 38 about an axis Y—Y, perpendicular to axis X—X, while the stiffness of flexure plates 38 about axis X—X prevents movement parallel to axis Y—Y. Flexure plates 38 are attached to the frames by cap screws 40 passing through flexure caps 42 and threading into the frames. It will also be readily understood that flexure plates 38 can be attached to frames 24a, 24b, 26a and 26b by any suitable means which would allow for their easy removal. Drag balance 20 is attached to flat plate 22 by means of bolts 44 passing through extensions 26c at either end of lower balance frame 26b. Drag balance 20 is secured inside strut 18 by means of securing screws 46 passing through strut 18 and threading into securing bores 48 on upper and lower ground frames 24a and 24b. In the embodiment shown, a total of four securing screws 46 are provided for each of ground frames 24a and 24b, two to each side of axis X—X. However, it will be understood that any suitable means of releasably securing ground frames 24a and 24b within strut 18 may be used. In order to maintain ground frames 24a and 24b and balance frames 26a and 26b steady during handling, two lock pins 50 are provided, each pin extending through lower ground frame 24b and into respective balance columns 32. Prior to testing, pins 50 are removed to allow bending of flexure plates 38. Lock pin bores 52 may be provided in strut 18, aligned with pins 40, to facilitate removal of pins 50. In order to measure the drag forces exerted on flat plate 22, strain gages 54 are provided on one or more of flexure plates 38 with data leads 56 to a processor (not shown). Drag forces exerted on flat plate 22 in the direction of axis X—X are transferred to bottom balance frame 26b, which is directly attached to flat plate 22 and to top balance frame 26a through balance columns 32. The drag forces result in the movement of balance frames 26a and 26b relative to ground frames 24a and 24b, causing flexure plates 38 to bend. Strain gages 54 measure the amount of strain in flexure plates 38 and hence the drag force causing the strain. Ground frames 24a and 24b and balance frames 26a and 26b are also provided with communication bores 58 for control wiring and the like to be connected to flat plate 22 or other model being towed.

The drag balance thus described is compact and can be made to easily fit within a streamlined strut. It provides a convenient and accurate way to measure drag forces on a model when a drag balance cannot be fitted within the model itself. The drag balance is attached directly to the model for an accurate measurement of the drag forces exerted on the model, yet provides a streamlined shape to prevent undesired turbulence.

Although the present invention has been described relative to a specific embodiment thereof, it is not so limited. The exact materials and shapes described can be modified to suit the testing conditions encountered. Various column shapes, including square and I-shaped, may be used and the columns may be welded or bolted to the frames. The material and thickness of the flexure plates can be varied to suit the expected drag forces. Further, the flexure plates may be welded to the frames at one end rather than being screwed to the frames.

Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A drag balance for measuring a force exerted on a body by a flowing medium, the body being held in the medium by a strut, the drag balance comprising:

a bottom balance frame portion removably secured to the body;

a top balance frame portion removably secured to the bottom balance frame portion in a spaced relation in a direction away from the body;

a top ground frame portion removably secured to the strut;

a bottom ground frame portion removably secured to the top ground frame portion in a spaced relation in a direction towards the body;

at least one first flexure plate removably connecting the top balance frame portion to the top ground frame portion; and at least one second flexure plate removably connecting the bottom balance frame portion to the bottom ground frame portion, the at least one second flexure plate bending in response to the force, the bending of the at least one second flexure plate corresponding to the bending of the at least one first flexure plate.

2. The drag balance of claim 1 wherein:

the top balance plate is positioned between and in spaced relation to the top and bottom ground frame portions; and the bottom ground frame portion is positioned between and in spaced relation to the top and bottom balance frame portions.

3. The drag balance of claim 2 further comprising:

at least one balance column securing the top balance frame portion to the bottom balance frame portion, the at least one balance column passing through corresponding at least one ground column bores in the bottom ground frame portion; and at least one ground column securing the top ground frame portion to the bottom ground frame portion, the at least one ground column passing through corresponding at least one balance column bores in the top balance frame portion.

4. The drag balance of claim 3 wherein the drag balance is positioned within a hollow portion of the strut, the top balance frame portion, the bottom balance frame portion, the top ground frame portion and the bottom ground frame portion being shaped to fit within the strut.

5. The drag balance of claim 4 wherein a communications bore extends through the top ground frame portion, the top balance frame portion, the bottom ground frame portion and the bottom balance frame portion, the communications bore allowing passage of communications circuitry through the strut and to the body.

6. The drag balance of claim 3 further comprising at least one stop pin for removable insertion through the bottom ground frame portion and extension into the at least one balance column, the at least one stop pin holding the top ground frame portion, the top balance frame portion, the bottom ground frame portion and the bottom balance frame portion in fixed relationship.

7. The drag balance of claim 3 wherein the at least one ground column and the at least one balance column are round in cross section.

8. The drag balance of claim 7 wherein:

the at least one ground column is press fit into corresponding column press fit bores in the top ground frame portion and the bottom ground frame portion; and the at least one balance column is press fit into corresponding balance fit bores in the top balance frame portion and the bottom balance frame portion.

9. A drag balance for measuring a force exerted on a body by a flowing medium, the body being held in the medium by a strut, the drag balance comprising:

a balance frame removably secured to the body;

a ground frame removably secured to the strut, the drag balance being positioned within a hollow portion of the strut, the ground frame and the balance frame being shaped to fit within the strut; and at least one first flexure plate removably connecting the balance frame to the ground frame, the at least one first flexure plate bending in response to the force, the bending providing a measurement of the force.

10. The drag balance of claim 9 wherein a communications bore extends through the ground frame and the balance frame, the communications bore allowing passage of communications circuitry through the strut and to the body.

* * * * *